United States Patent [19]
Shimei et al.

[11] Patent Number: 5,697,860
[45] Date of Patent: Dec. 16, 1997

[54] AUTOMATIC TRANSMISSION

[75] Inventors: Masato Shimei, Nagoya; Suguru Futamura, Toyokawa, both of Japan

[73] Assignee: Aisin Seiki Kabushiki Kaisha, Kariya, Japan

[21] Appl. No.: 644,572

[22] Filed: May 10, 1996

[30] Foreign Application Priority Data

May 10, 1995 [JP] Japan .................................. 7-112052

[51] Int. Cl.⁶ .................................................. F16H 61/00
[52] U.S. Cl. .......................... 475/128; 475/116; 477/143; 477/155
[58] Field of Search ................................ 475/123, 127, 475/128, 116; 477/143, 154, 155, 156

[56]  References Cited

U.S. PATENT DOCUMENTS

| | | |
|---|---|---|
| 5,058,461 | 10/1991 | Shimei . |
| 5,311,795 | 5/1994 | Yoshimura et al. ............ 475/123 |
| 5,468,198 | 11/1995 | Holbrook et al. ............... 477/143 |
| 5,501,645 | 3/1996 | Taniguchi et al. .............. 475/123 X |
| 5,505,673 | 4/1996 | Tsukamoto et al. ............ 477/143 X |
| 5,527,236 | 6/1996 | Kimura et al. ................. 477/131 |
| 5,547,437 | 8/1996 | Kamada et al. ................ 477/155 X |
| 5,551,931 | 9/1996 | Matsumoto ..................... 477/155 X |
| 5,573,478 | 11/1996 | Tsukamoto et al. ........... 477/143 X |

*Primary Examiner*—Khoi Q. Ta
*Assistant Examiner*—Peter T. Kwon
*Attorney, Agent, or Firm*—Burns, Doane, Swecker & Mathis, LLP

[57]  ABSTRACT

An automatic transmission includes the transmission control device which sets a control time upon changeover from the second gear condition to the third gear condition during which the brake device is maintained in the engaged condition until changing to the disengaged condition. The transmission control device also adds a compensating time to the control time upon changeover from the second gear condition to the third gear condition in certain circumstances such as when changeover from the second gear condition to the third gear condition follows operation under the first gear condition, and when change over from the second gear condition to the third gear condition follows vehicle operation under the second gear condition for a period exceeding a predetermined time (e.g., 10 seconds).

14 Claims, 11 Drawing Sheets

AUTOMATIC TRANSMISSION

FIELD OF THE INVENTION

The present invention relates to an automatic transmission for vehicles, and more particularly to an automatic transmission that is designed to delay the changeover of a friction engaging element from an engaged condition to a disengaged condition.

BACKGROUND OF THE INVENTION

A known type of automatic transmission is disclosed in, for example, U.S. Pat. No. 5,058,461. This automatic transmission, which is adapted to be used in a vehicle for example, includes a planetary gear device, an input side shaft, an output side shaft, a clutch device, a brake device and a transmission control device. The planetary gear device is comprised of a ring gear, a sun gear which is disposed inside of the ring gear and which is rotated around an axis that is coaxial with the ring gear, a carrier, and a pinion which is rotatably supported on the carrier for engaging the ring gear and the sun gear.

During the normal driving of the vehicle, the input side shaft is rotated with the ring gear as a unit and the output side shaft is rotated with the carrier as a unit. The clutch device engages the sun gear with the input side shaft or disengages the sun gear from the input side shaft. The brake device engages the sun gear with a housing or disengages the sun gear from the housing. The transmission control device controls the operation of the clutch device and the brake device so as to changeover amongst a first condition (first gear condition) in which the clutch device and the brake device are in the disengaged condition, a second condition (second gear condition) in which the clutch device is in the disengaged condition and the brake device is in the engaged condition, and a third condition (third gear condition) in which the clutch device is in the engaged condition and the brake device is in the disengaged condition. The transmission control device is provided with a control timer which is started when the operation of the clutch device and the brake device is changed from the second condition to the third condition. The transmission control device is designed to place the clutch device in the completely disengaged condition after the control timer is ended.

In the above-type of automatic transmission, the clutch device normally includes a piston which is slidably and fluid tightly fitted into a pressure chamber formed in the sun gear, a plurality of discs which are axially movably supported on the input side shaft so as to be unitarily rotated with the input side shaft, and a plurality of plates which are axially movably supported on the sun gear so as to be unitarily rotated with the sun gear. When oil pressure in the pressure chamber becomes higher than a predetermined value, the piston is slid so that the discs are frictionally engaged with the plates (the engaged condition). The clutch device further includes a check ball which allows communication between the pressure chamber and the outside of the pressure chamber when the oil pressure in the pressure chamber is lower than the predetermined value and which prevents communication between the pressure chamber and the outside thereof when the oil pressure in the pressure chamber is higher than the predetermined value. Consequently, even though the sun gear is rotated under the disengaged condition of the clutch device, since the oil pressure in the pressure chamber is not increased by centrifugal force, the piston is prevented from incorrectly or inadvertently sliding in a manner that positions the clutch device in the engaging condition.

When the clutch device is in the disengaged condition at the shifting operation, the pressure chamber is communicated to the outside of the pressure chamber through the check ball so that the oil pressure in the pressure chamber is generally zero, although the pressure chamber is filled with oil. In the situation where the sun gear is not rotated, the oil in the pressure chamber gradually escapes to the outside. In the situation where the sun gear is rotated under the first condition, however, the oil in the pressure chamber rapidly escapes to the outside. When the shift at which the clutch device is in the engaged condition is completed, oil is supplied to the pressure chamber. At this point, the time when the clutch device begins to operate is changed or varies based on the amount of oil remaining in the pressure chamber before the shifting operation.

In the above prior automatic transmission, when the shift from the second range to the third range occurs, the brake device is operated so as to be in the disengaged condition and then the clutch device is operated so as to be in the engaged condition. If the time when the clutch device begins to operate is changed, the time interval until the clutch device really reaches the engaged condition after the brake device is really made to be in the disengaged condition changes. If this interval is long, a neutral condition is generated. Particularly in the case where the vehicle is in the accelerating condition such as the shifting operation from the second gear range to the third gear range, the rotational speed of the engine is temporally increased and there is a danger that shift-shock will be generated when the clutch device finally reaches the engaged condition. Furthermore, with increased rotational speed of the engine, the running sound of the engine becomes loud and there is the possibility that the running sound will make the driver and the passengers uncomfortable.

Therefore, a need exists for an improved automatic transmission device that is able to overcome the above drawbacks.

SUMMARY OF THE INVENTION

In accordance with one aspect of the present invention, an automatic transmission includes: a housing; a planetary gear device disposed in the housing and including a ring gear, a sun gear which is disposed inside of the ring gear and which is rotated around an axis that is coaxial with the ring gear, a carrier, and a pinion which is rotatably supported on the carrier and which is engageable with the ring gear and the sun gear, the sun gear being provided with a pressure chamber for receiving oil; an input side shaft which rotates with the ring gear; and an output side shaft which rotates with the carrier. A clutch device is selectively positionable in an engaged condition in which the sun gear is engaged with the input side shaft and a disengaged condition in which the sun gear is disengaged from the input side shaft in response to oil pressure in the pressure chamber of the sun gear. A check valve is provided in the pressure chamber to permit oil in the pressure chamber to flow outside of the pressure chamber when the oil pressure in the pressure chamber is lower than a predetermined value and to prevent oil in the pressure chamber from flowing outside of the pressure chamber when the oil pressure in the pressure chamber is higher than the predetermined value. A brake device is selectively positioned in an engaged condition in which the sun gear is engaged with the housing and a disengaged condition in which the sun gear is disengaged from the housing. A transmission control device is provided to control the operation of the clutch device and the brake device to changeover among a first operating condition in which the clutch device and the brake device are in the disengaged condition, a second operating condition in which the clutch device is in the disengaged condition and the brake device is in the engaged condition, and a third operating condition in which the clutch device is in the engaged condition and the brake device is in the disengaged condition. The transmission control device includes an arrangement for setting a control time upon changeover from the second operating condition to the third operating condition during which the brake device is maintained in the engaged condition until changing to the disengaged condition, and a compensating arrangement for adding a compensating time to the control time upon changeover from the second operating condition to the third operating condition at least when changeover from the second operating condition to the third operating condition follows operation under the first operating condition.

In accordance with another aspect of the invention, an automatic transmission includes: a housing; a planetary gear device disposed in the housing and including a ring gear, a sun gear which is disposed inside of the ring gear and which is rotated around an axis that is coaxial with the ring gear, a carrier, and a pinion which is rotatably supported on the carrier and which is engageable with the ring gear and the sun gear, the sun gear being provided with a pressure chamber for receiving oil; an input side shaft which rotates with the ring gear; an output side shaft which rotates with the carrier; a clutch device selectively positionable in an engaged condition in which the sun gear is engaged with the input side shaft and a disengaged condition in which the sun gear is disengaged from the input side shaft in response to oil pressure in the pressure chamber of the sun gear; and a check valve which permits oil in the pressure chamber to flow outside of the pressure chamber when the oil pressure in the pressure chamber is lower than a predetermined value and which prevents oil in the pressure chamber from flowing outside of the pressure chamber when the oil pressure in the pressure chamber is higher than the predetermined value. A brake device is selectively positionable in an engaged condition in which the sun gear is engaged with the housing and a disengaged condition in which the sun gear is disengaged from the housing. A transmission control device controls the operation of the clutch device and the brake device to changeover among a first operating condition in which the clutch device and the brake device are in the disengaged condition, a second operating condition in which the clutch device is in the disengaged condition and the brake device is in the engaged condition, and a third operating condition in which the clutch device is in the engaged condition and the brake device is in the disengaged condition. The transmission control device includes an arrangement for setting a control time upon changeover from the second operating condition to the third operating condition during which the brake device is maintained in the engaged condition until changing to the disengaged condition, and an arrangement for adding a compensating time to the control time upon changeover from the second operating condition to the third operating condition when changeover from the second operating condition to the third operating condition follows operation under the second operating condition that has continued longer than a predetermined time.

BRIEF DESCRIPTION OF THE DRAWING FIGURES

Additional features and aspects of the present invention will become more apparent from the following detailed description of a preferred embodiment when considered with reference to the accompanying drawing figures, in which like elements bear like reference numerals and wherein.

Figure 10:
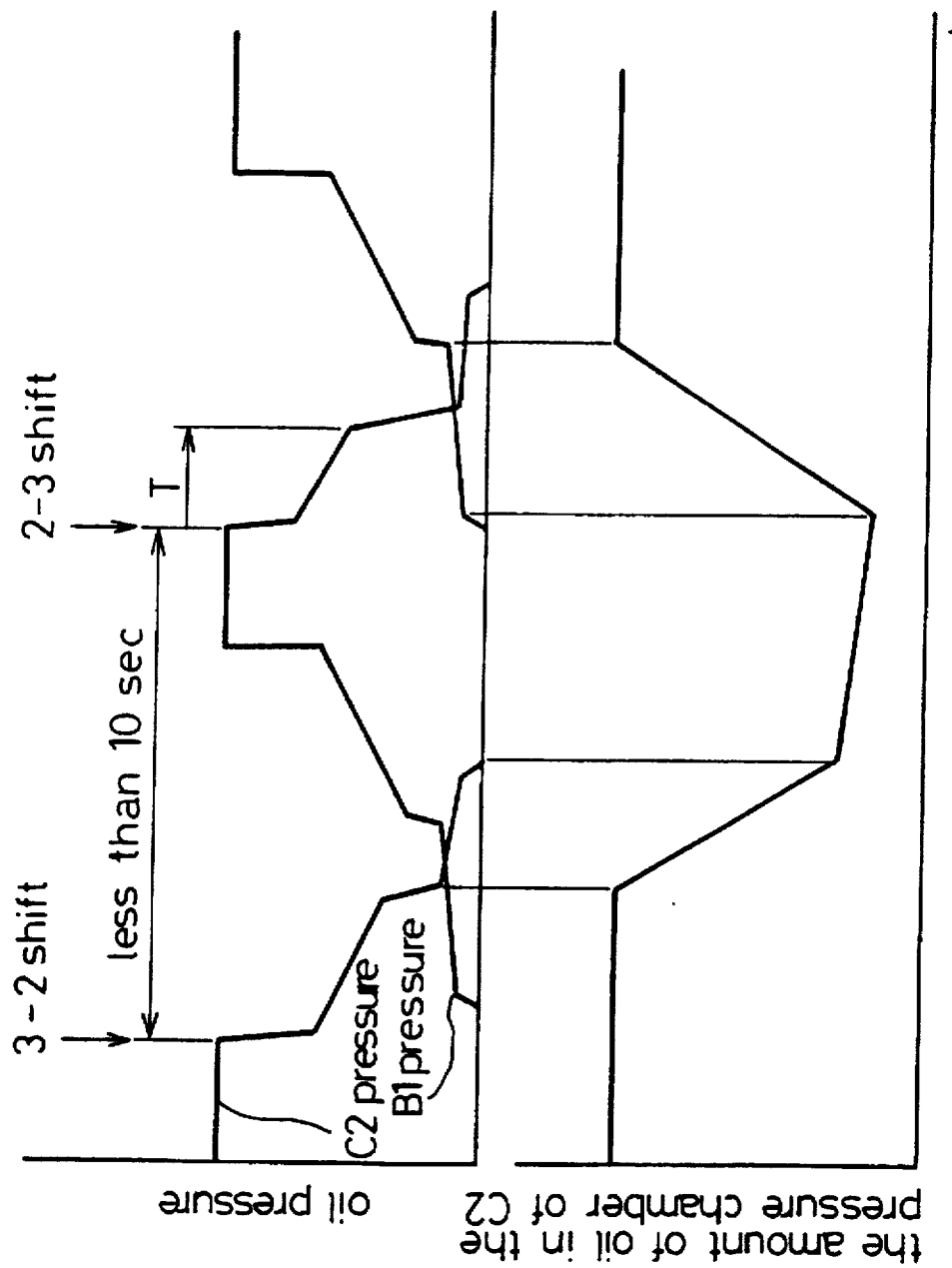
Figure 11:
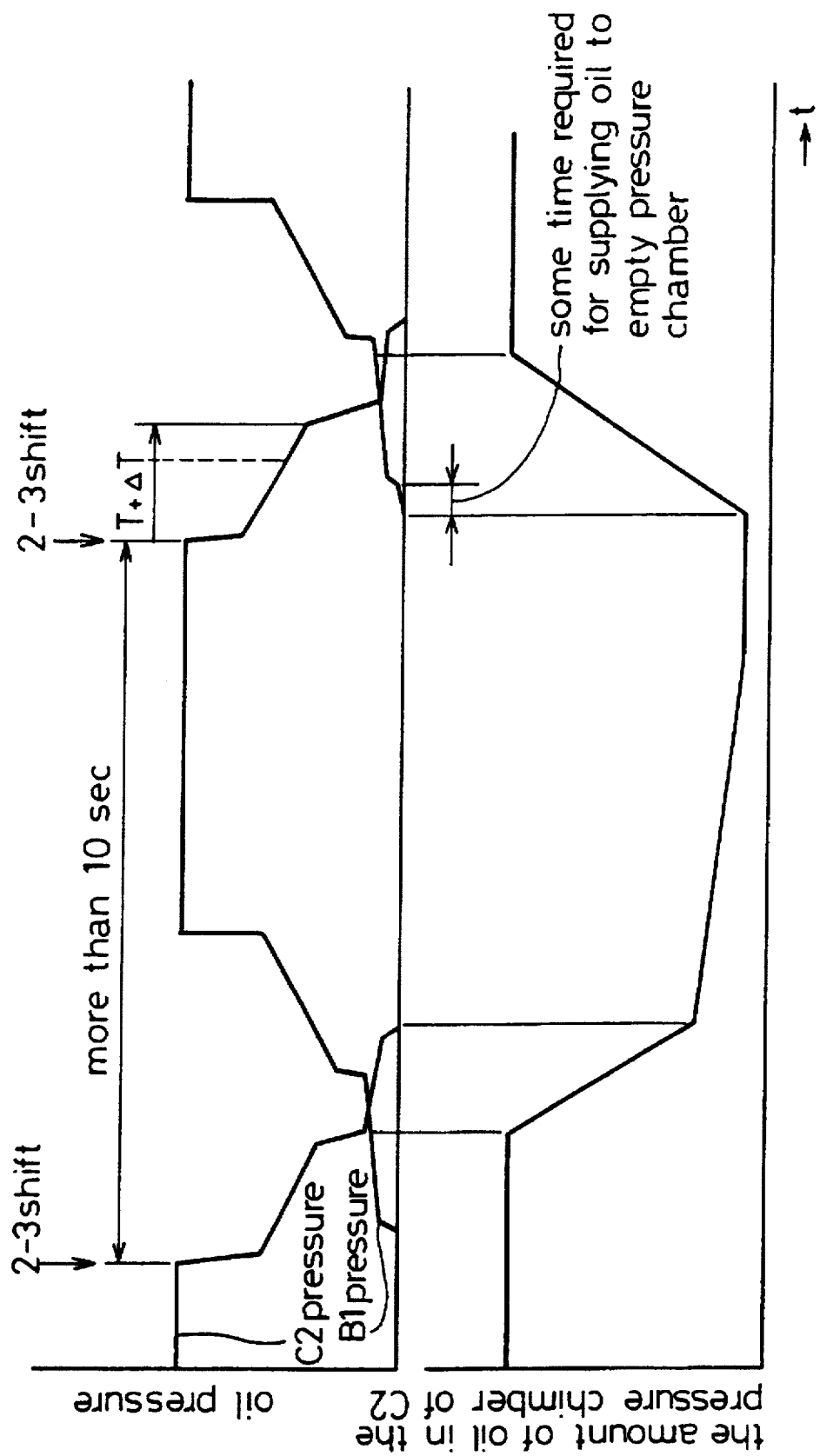
Figure 12:
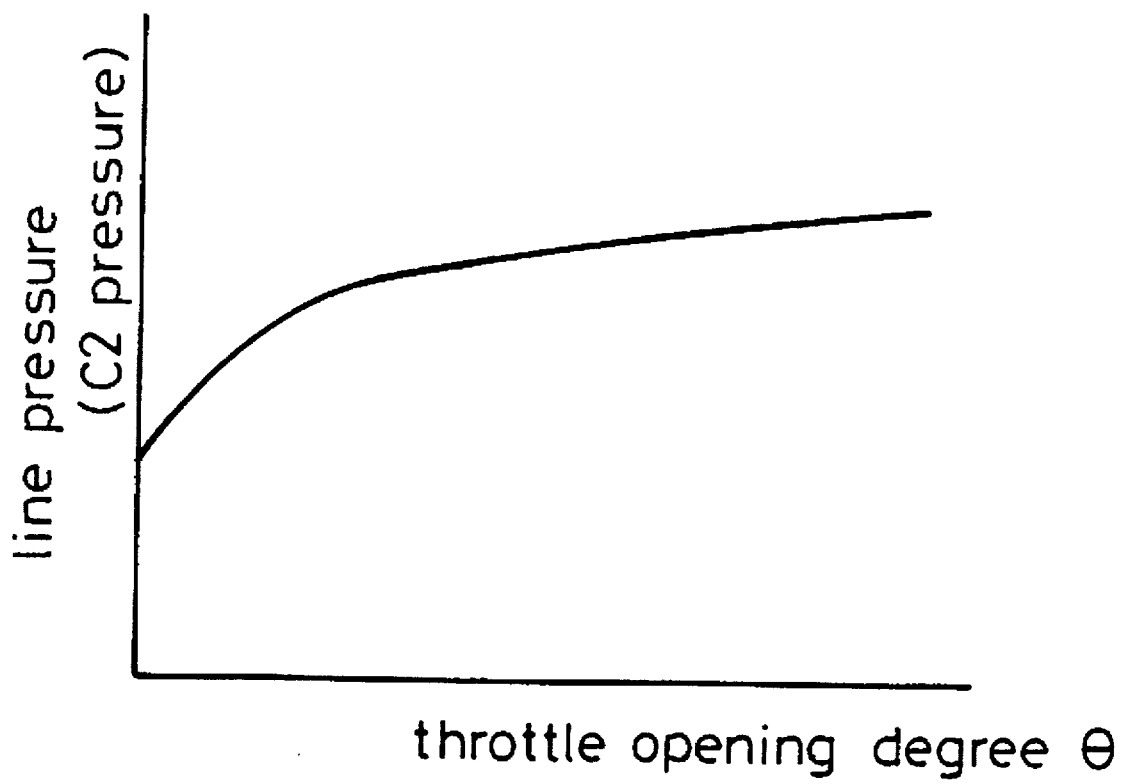

FIG. 10 and FIG. 11 are time chaffs showing the B1 brake device oil pressure PB1, the C2 clutch device oil pressure PC2 and the amount of oil in a pressure chamber of the C2 clutch device in the automatic transmission in accordance with the present invention; and FIG. 12 is a graph illustrating characteristics between a throttle opening degree and the C2 clutch device oil pressure in the automatic transmission in accordance with the present invention.

DESCRIPTION OF THE PREFERRED EMBODIMENT

Figure 1:
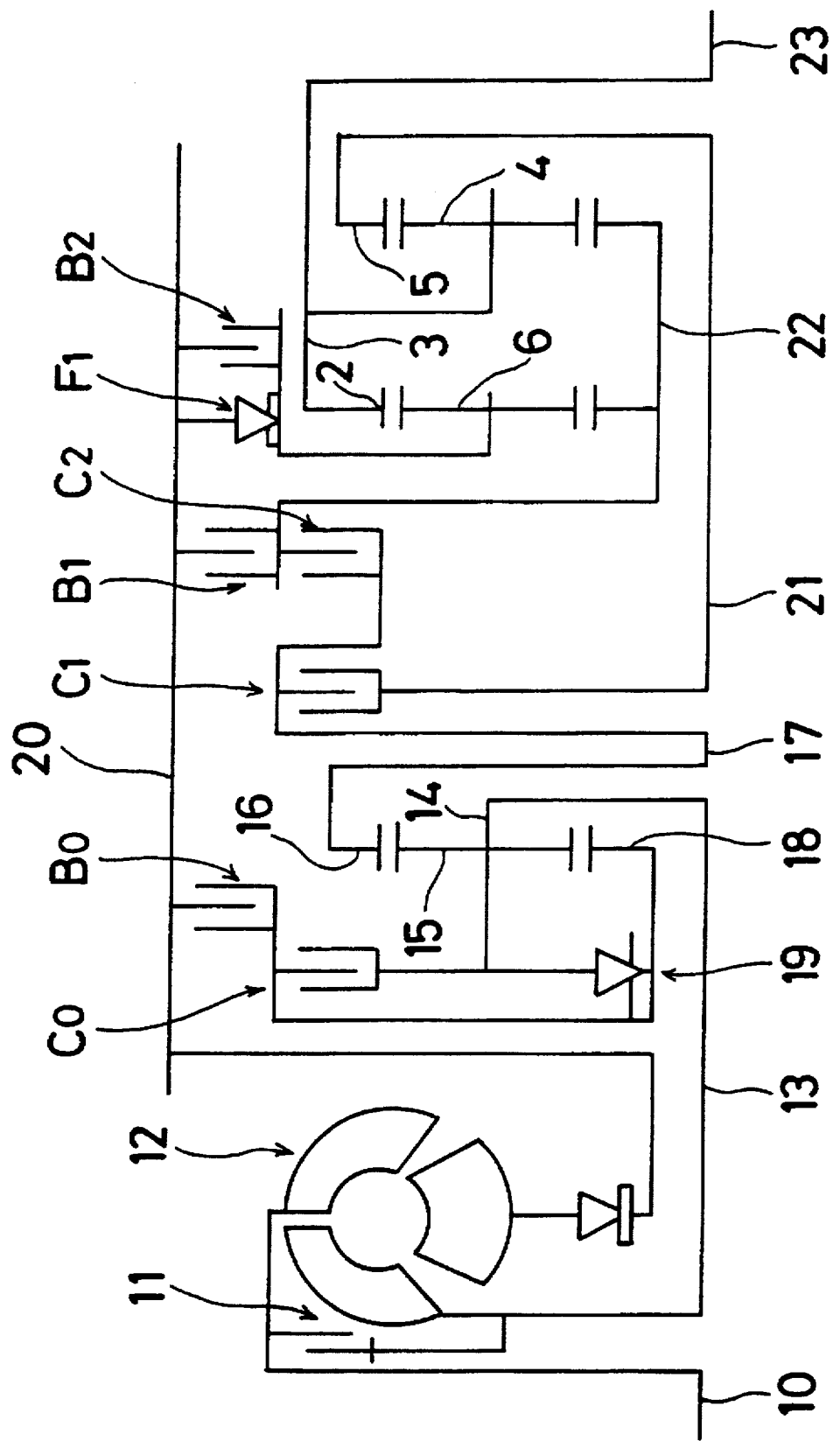
FIG. 1 is a schematic representation of a gear train of an embodiment of an automatic transmission in accordance with the present invention.

Referring to FIG. 1 which shows a gear train of an automatic transmission according to the present invention, one end of a turbine shaft is connected to an engine output shaft 10 of an engine via a torque converter 12. The torque converter 12 is provided with a lock-up clutch 11 which prevents the torque converter 12 from functioning and directly connects the turbine shaft 13 to the engine output shaft 10. The other end of the turbine shaft 13 is connected to a carrier 14 of a planetary gear device. A planetary pinion 15 which is rotatably supported on the carrier 14 is engaged with a ring gear 16 connected to a first intermediate shaft 17. Simultaneously, the planetary pinion 15 is engaged with a sun gear 18.

A one-way clutch device 19 and an OD clutch device C0 are disposed between the sun gear 18 and the carrier 14, and an OD brake device B0 is disposed between the sun gear 18 and a housing 20. A C1 clutch device is disposed between the first intermediate shaft 17 and a second intermediate shaft 21, and a C2 clutch device is disposed between the first intermediate shaft 17 and a sun gear 22. A B1 brake device is disposed between the housing 20 and the sun gear 22. The second intermediate shaft 21 is connected to a ring gear 5 and the ring gear is engaged with a planetary pinion 4 which is rotatably supported on a carrier 3 connected to an output shaft 23. The planetary pinion 4 is engaged with the sun gear 22 and the sun gear 22 is further engaged with a planetary pinion 6 that engages a ring gear 2 connected to the carrier 3. A B2 brake device and a one way clutch device F1 are disposed in parallel between the housing 20 and a supporting member on which the planetary pinion 6 is rotatably supported. The first and second intermediate shafts 17, 21 constitute an input side shaft for the planetary gear device which is comprised of the ring gear 5, the sun gear 22, the carrier 3 and the planetary pinion 4. Further, the output shaft 23 constitutes an output side shaft for this planetary gear device.

In this gear train, the shifting of the transmission is effected by a shift control of a solenoid valve, and the operation of multiple element friction engaged devices (C0, C1, C2, B0, B1, B2) in each gear ratio are shown in the following Table 1.

TABLE 1

|   |     | C0 | C1 | C2 | B0 | B1 | B2 |
|---|-----|----|----|----|----|----|----|
|   | R   | O  | X  | O  | X  | X  | O  |
|   | P,N | O  | X  | X  | X  | X  | X  |
|   | O/D | X  | O  | O  | O  | X  | X  |
| D | 3RD | O  | O  | O  | X  | X  | X  |
|   | 2ND | X  | O  | X  | X  | O  | X  |
|   | 1ST | O  | O  | X  | X  | X  | X  |
| 2 | 2ND | O  | O  | X  | X  | O  | X  |
|   | 1ST | O  | O  | X  | X  | X  | X  |
|   | L   | O  | O  | X  | X  | X  | O  | where
O: frictionally engaged condition
X: disengaged condition

The operations of the multiple element friction engaging devices (C0, C1, C2, B0, B1, B2) are controlled by an oil pressure circuit. This oil pressure circuit is controlled by solenoid valves that are under the control of the electric control device 30 shown in FIG. 4. The electric control device 30 determines whether or not the shift is possible according to the position of a shift lever (not shown) and the stage of the shift, and controls the operation of the multiple element friction engaging devices (C0, C1, C2, B0, B1, B2) according to the shifting condition shown in the following Table 2.

TABLE 2

| Shift     | Engaged side | Disengaged side |
|-----------|--------------|-----------------|
| 1st→2nd   | C0           | B1              |
| 1st→3rd   | —            | C2              |
| 1st→O/D   | C0           | B0, C2          |
| 1st→N     | C1           | —               |
| 1st→R     | C1           | C2, B2          |
| 2nd→3rd   | B1           | C2              |
| 2nd→O/D   | B1           | B0, C2          |
| 2nd→N     | B1, C1       | C0              |
| 2nd→R     | B1, C1       | B2, C2, C0      |
| 3rd→O/D   | C0           | B0              |
| 3rd→N     | C2, C1       | —               |
| 3rd→R     | C1           | B2              |
| O/D→N     | B0, C1, C2   | C0              |
| O/D→R     | B0, C1       | C0, B2          |
| N→R       | —            | B2, C2          |

Figure 2:
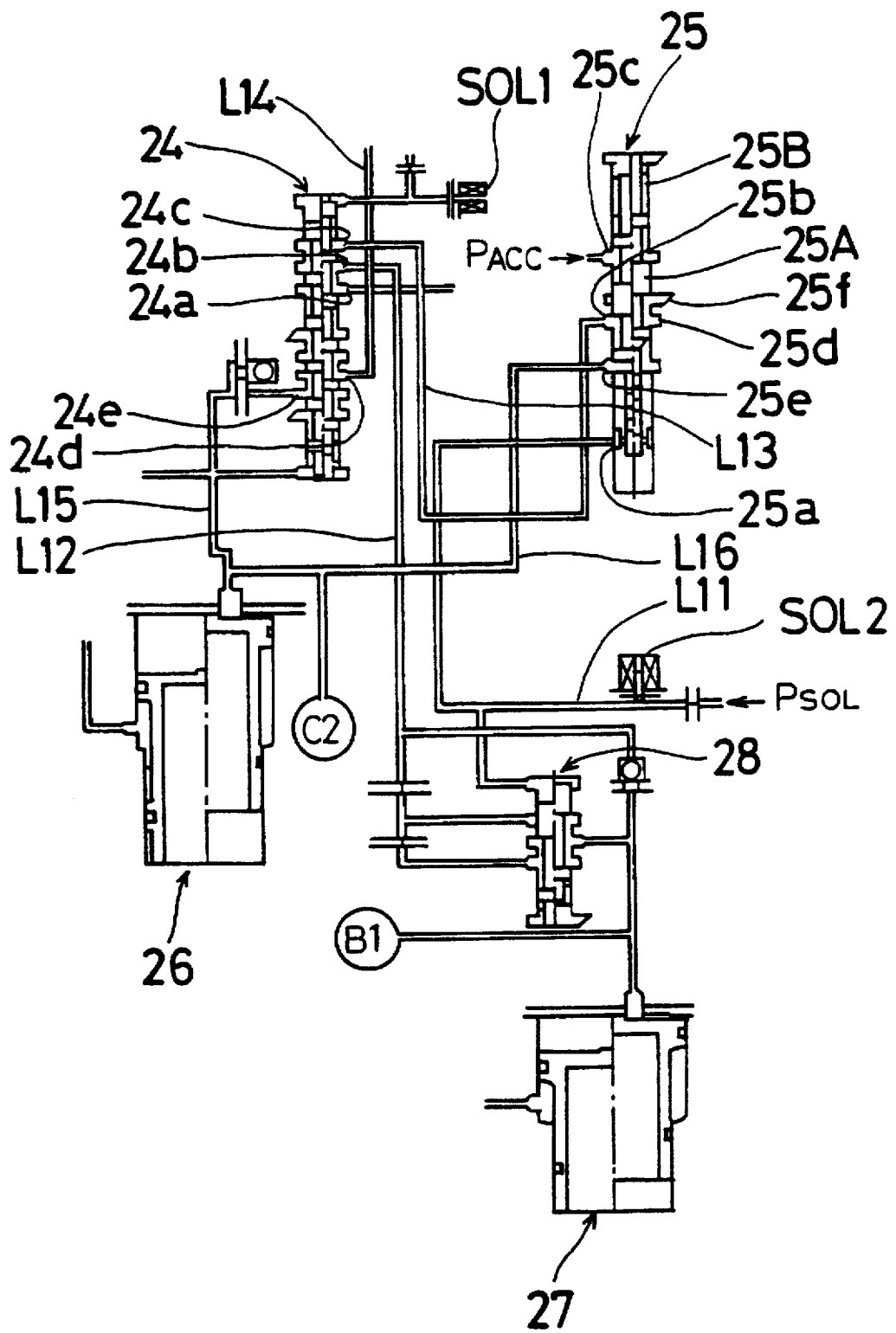
FIG. 2 is an oil pressure control circuit for controlling the C2 clutch device and the B1 brake device depicted in FIG. 1.

FIG. 2 shows a part of the oil pressure circuit communicating with the gear train in FIG. 1. Reference numeral 24 indicates a 2→3 shift valve, element 25 is a 2→3 shift timing valve, reference numeral 26 indicates a C2 clutch accumulator, element 27 is a B1 brake accumulator, and element 28 is a B1 brake orifice control valve. SOL1 is a 2→3 shift solenoid valve and SOL2 is a timing solenoid valve provided in an oil passage L11 connected to an under lap control port 25a of the 2→3 shift timing valve 25. The 2→3 shift solenoid valve SOL1 and the timing solenoid valve SOL2 are operated by a signal from a CPU of the electric control device 30 shown in FIG. 4. In this embodiment, the 2→3 shift solenoid valve SOL1 is a normally closed type solenoid valve and the timing solenoid valve SOL2 is a normally open type solenoid valve.

When the 2→3 shift solenoid valve SOL1 is "ON", oil pressure acts on the 2→3 shift valve 24 and the 2→3 shift valve is changed. When the 2→3 shift valve is changed (in the left half valve condition shown in FIG. 2) at the 2→3 shift-up, oil pressure supplied from a 1→2 shift valve (not shown) to a port 24a is cut off, and a port 24b supplying oil pressure to the B1 brake device is opened to a port 24c transmitting oil pressure to the 2→3 shift timing valve 25. Thus, oil pressure (B1 oil pressure) from the B1 brake device and the B1 accumulator 27 is supplied to the port 25b of the 2→3 shift timing valve 25 through the passage L12, the port 24b, the port 24c and the passage L13. At this time, the spool 25A of the 2→3 shift timing valve 25 is located in the lower position (in the left half valve condition depicted in FIG. 2) due to the return spring 25B and an accumulator back pressure PACC supplied from an accumulator (not shown) to the port 25c. Therefore, the B1 oil pressure supplied to the port 25b is reduced by draining the oil through an orifice 25d, and the oil pressure of the B1 brake device slowly decreases. The 2→3 shift valve 24 is changed by the 2→3 shift-up, the port 24d is communicated with the port 24a, and the line pressure supplied through the passage L14 is supplied to the C2 clutch device through the passage L15. At the same time, the line pressure (C2 oil pressure) supplied to the C2 clutch device is supplied to the port 25e of the 2→3 shift timing valve 25 through the passage L16. This line pressure acts in the opposite direction of the return spring 25B and the accumulator back pressure PACC from the port 25c against the spool 25A. After the piston stroke of the C2 clutch device for engaging the multiple friction elements has been completed and the C2 oil pressure (PC2) supplied to the 2→3 shift timing valve 25 has reached a fixed value, the spool 25A moves up against the force of the spring 25B and the accumulator back pressure PACC (in the right half valve condition shown in FIG. 2). Thus, the port 25b is communicated with the drain port 25f and the B1 brake oil pressure is quickly reduced by draining the oil through the drain port 25f.

At this time, the force balance on the valve spool of the 2→3 shift timing valve 25 is represented as follows:

$$S1 \times PC24 \, F + \Delta S + PACC \tag{1}$$

where:
S1: the pressure area of PC2;
F: the spring force of the return spring 25B; and
ΔS: the pressure area of the accumulator back pressure PACC.

When the oil pressure PC2 satisfies the formula (1), the 2→3 shift timing valve 25 is changed.

On the one hand, when the timing solenoid valve SOL2 is "ON", the solenoid oil pressure PSOL, modulating the line pressure, is supplied to the port 25a of the 2→3 shift timing valve 25 through the passage L11 and acts in the opposite direction to the return spring 25B and the accumulator back pressure PACC against the spool 25A. At this time, the force balance of the 2→3 shift timing valve 25 is represented as follows:

$$(S1-S2) \times PC2 + S2 \times PSOL = F + \Delta S \times PACC \quad (2)$$

where:

S2: the pressure area of PSOL.

When the solenoid oil pressure PSOL and the pressure area S2 are large enough, the spool 25A moves upward without regard to the oil pressure PC2, and the 2→3 shift timing valve 25 is changed.

Accordingly, when the 2→3 shift solenoid valve SOL1 is changed ("ON") and then the timing solenoid valve SOL2 is changed ("ON") at the predetermined time after the 2→3 shift solenoid valve SOL1 is changed, the 2→3 shift-up operation is done. This predetermined time (the control time) is determined by a control timer of the CPU of the electric control device 30 in FIG. 4.

Figure 3:
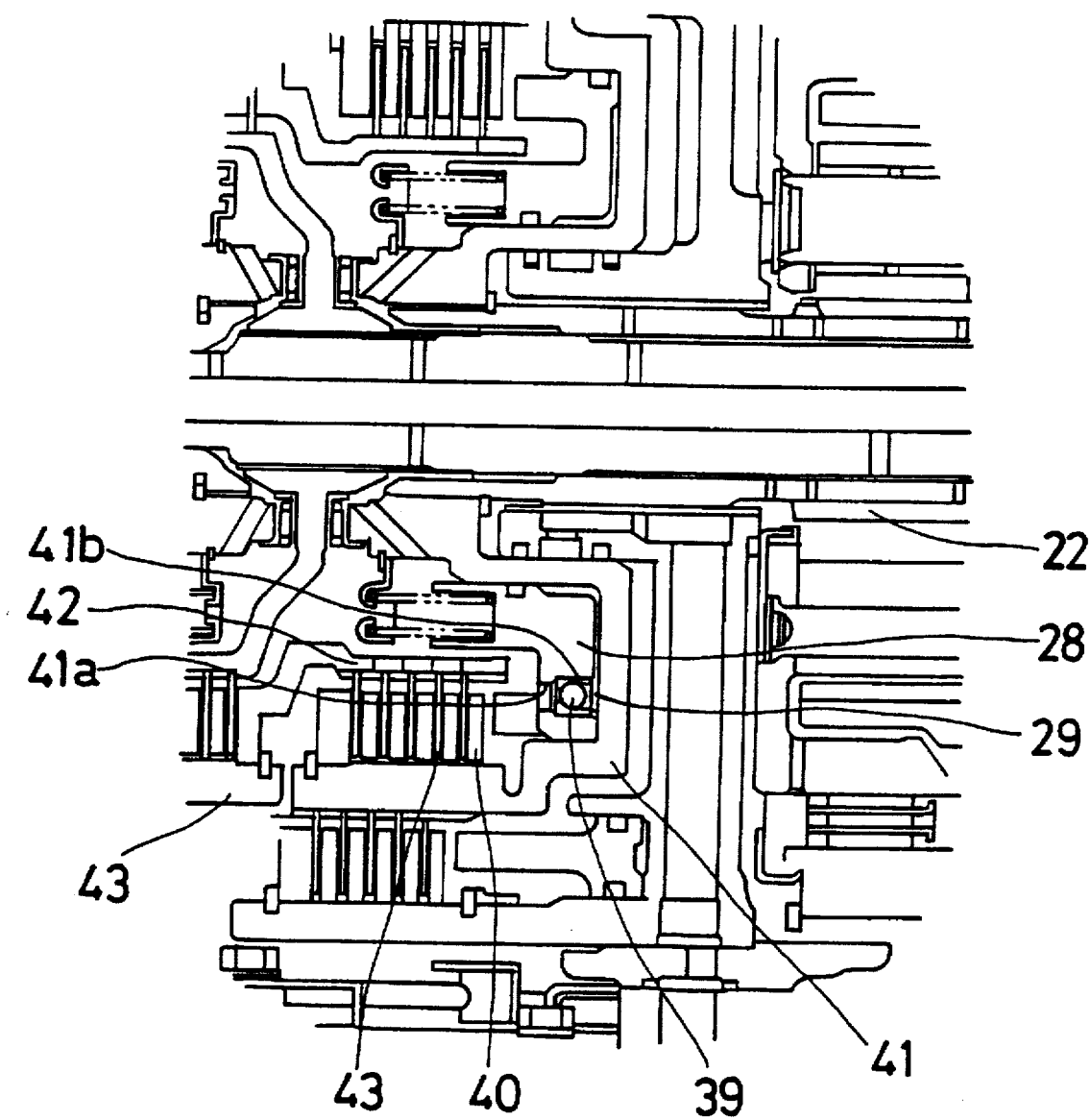
FIG. 3 is a sectional view of a portion of the clutch device C2 shown in FIG. 1.

As shown in FIG. 3, the C2 clutch device includes a piston 28 which is slidably and fluid tightly fitted into a pressure chamber 29 formed in a drum member 41 that is freed to the sun gear 22. The C2 clutch device also includes a plurality of plates 43 which are supported on a member 42 and a plurality of discs 40 which are axially movably supported on the drum member 41 so as to be rotated with the sun gear 22 as a unitary body. The member 42 is connected to the intermediate shaft 17 so as to be rotated with the intermediate shaft 17 as a unitary body. Thus, when oil pressure in the pressure chamber 29 becomes higher than a predetermined value, the piston 28 is slid so that the discs 40 are frictionally engaged with the plates 43 (the engaged condition).

The C2 clutch device further includes a check ball 39 which is movably disposed in a hole 41a communicating the pressure chamber 29 with an area outside the pressure chamber 29. A seat member 41b is disposed in the hole 41a and the check ball 39 is seated in a fluid tight manner on the seat member to interrupt the fluid communication through the hole 41a when the oil pressure in the pressure chamber is higher than the predetermined value. Therefore, the check ball 39 allows communication between the pressure chamber 29 and the outside of the pressure chamber 29 when the oil pressure in the pressure chamber 29 is lower than the predetermined value and prevents communication between the pressure chamber 29 and the outside thereof when the oil pressure in the pressure chamber 29 is higher than the predetermined value. When the sun gear 22 is rotated under the disengaging condition of the C2 clutch device, the check ball 39 moves outwardly in the radial direction by centrifugal force to allow communication through the hole 41a and the oil in the pressure chamber 29 rapidly escapes to the outside of the pressure chamber 29 by centrifugal force.

Figure 4:
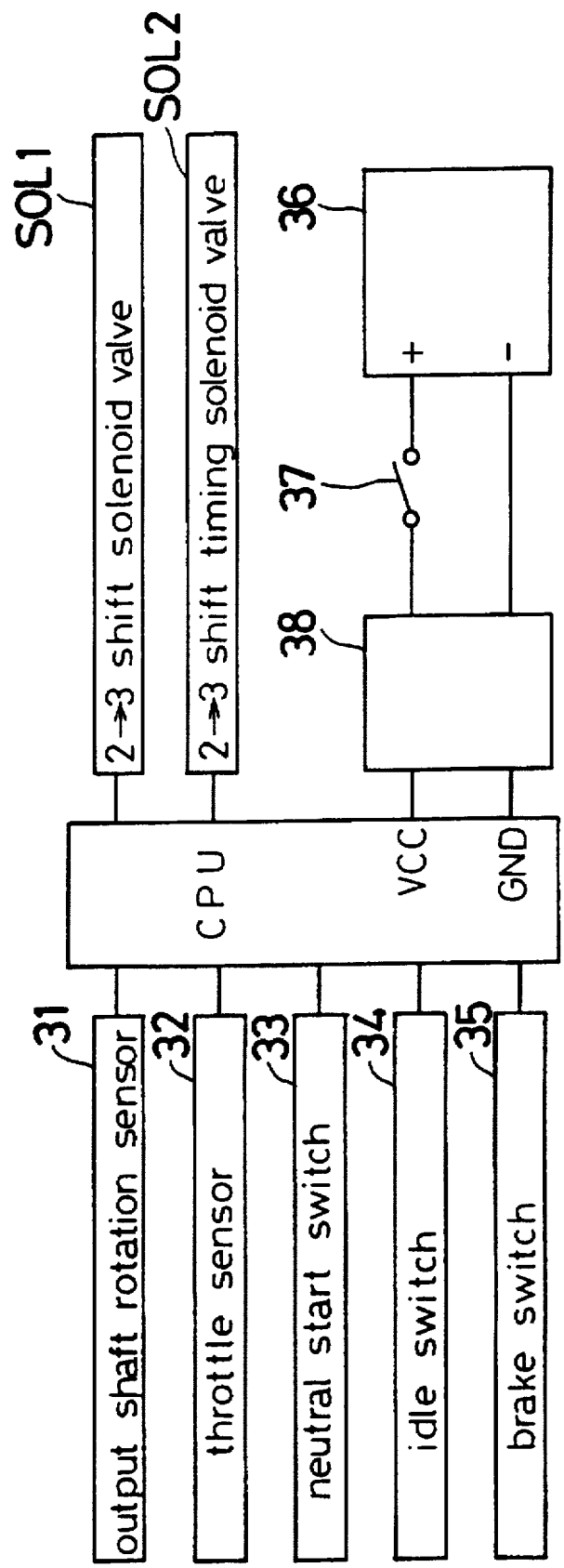
FIG. 4 is a block diagram of an electric control device for controlling the oil pressure control circuit of FIG. 2.

Referring to FIG. 4, each of the solenoid valves is operated by a central control unit CPU. The terminals of a battery 36 are connected to the input terminals of a constant voltage power source circuit 38 through an ignition switch 37. The output terminals of the constant voltage power source circuit 38 are connected to a VCC terminal and a GND terminal of the central control unit CPU. The constant voltage power source circuit 38 transforms the output voltage of the battery 36 into the voltage which can operate the central control unit CPU.

An output shaft rotation sensor 31, a throttle sensor 32, a neutral start switch 33, an idle switch 34 and a brake switch 35 are connected to input terminals of the central control unit CPU, respectively. It is to be recognized that in the illustration of FIG. 4, the input interfaces of the sensors and the switches have been omitted.

The output shaft rotation sensor 31 is a sensor for detecting the rotational speed of the output shaft of the automatic transmission. The output shaft rotation sensor 31 is disposed in the vicinity of the output shaft of the automatic transmission and generates a pulse signal having a frequency which is changed in response to the rotational speed of the output shaft of the automatic transmission. In this embodiment, the output shaft rotation sensor 31 is an electromagnetic pick-up type rotation sensor which is disposed so as to be opposite to a gear fixed to the output shaft 23 and generates IS pulses based on rotation of the gear. This output signal is sent to the central control unit. If the gear ratio of the differential gear disposed between the output shaft and the axis of the driving wheels is clearly known, it is possible to replace the output shaft rotational speed sensor with another speed sensor that detects the rotational speed of the axis of the driving wheel or the driven wheel.

The throttle sensor 32 is a sensor for detecting the degree of opening of a throttle valve (not shown). A digital sensor which detects the rotational angle of the throttle valve by a switch and divides the opening degree of the throttle valve, a mechanical sensor, an analog sensor which transforms the rotational angle of the throttle valve into a voltage value and divides the opening degree of the throttle valve by way of an A/D converter, and an electrical sensor are all well known sensors that can be used as the throttle sensor. In this embodiment, one of these various types of throttle sensors can be used. The throttle sensor generates a signal dividing the opening degree of the throttle valve into 16 different possible signals from four signal lines. When the throttle valve is fully closed, the throttle sensor 32 generates a signal θ0. When the throttle valve is fully opened, the throttle sensor 32 generates a signal θ15. When the throttle valve is in the condition between the fully closed condition and the fully opened condition, the throttle sensor 32 generates a signal θ1~θ14.

The neutral start switch 33 is a sensor for detecting the position of a shift lever (not shown). The neutral start switch 33 is provided with a D (drive) range switch, an L (low) range switch, a 2 (second) range switch, an N (neutral) range switch, an R (reverse) range switch, and a P (parking) range switch and detects the range position.

The idle switch 34, which is a sensor for detecting the idling condition of the engine, is "ON" when the engine is in the idling condition (in this embodiment, the opening degree of the throttle valves less than 1.5%). The brake switch 35 is a sensor for detecting the operating condition of a brake apparatus of the vehicle (not shown).

The 2→3 shift solenoid valve SOL1 and the timing solenoid valve SOL2 are connected to respective output terminals of the central control unit CPU. In FIG. 4, output interfaces and drive circuits of the solenoid valves SOL1 and SOL2 are omitted. The operation of the 2→3 shift solenoid valve SOL1 and the timing solenoid valve SOL2 are controlled by the central control unit CPU. The central control unit CPU includes memories, timers including a control timer, and registers such as RAM, ROM and so on. The central control unit CPU starts to carry out the main routine shown in FIG. 5 when the ignition switch 37 is changed ("ON") and a voltage is applied.

Figure 5:
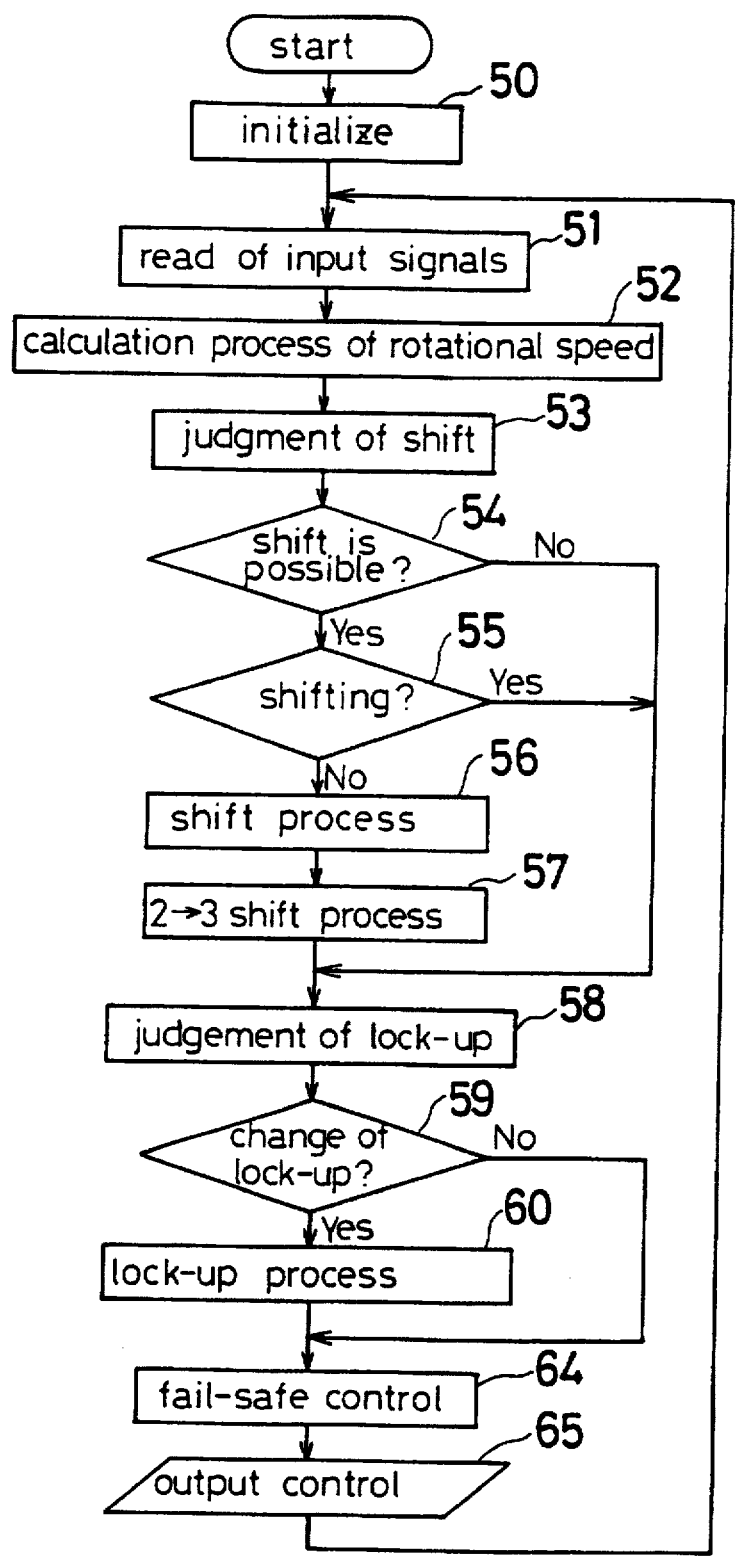
FIG. 5 is a flow chart of a main routine of the electric control device of FIG. 4.

Referring to FIG. 5, as the central control unit CPU staffs to carry out the main routine, each of the memories is initialized at a step 50. Then, the signals from each of the sensors and switches which are connected to the input terminals of the central control unit CPU are read at step 51.

Next, the rotational speed calculation process is carried out at step 52. At step 52, the output shaft rotational speed NO is calculated in accordance with the output signal of the output shaft rotation sensor 31 and the vehicle speed is calculated based on the output shaft rotational speed NO, the gear ratio between the output shaft and the wheel axis, and the diameter of the wheel.

Then, a shift judgement is carried out at steps 53, 54. At steps 53, 54, it is judged whether the automatic transmission should be shifted (or can be shifted) from the present gear condition to the other gear condition in accordance with the position of the shift lever, the vehicle speed and the throttle opening degree. If it is judged that the shift is possible at step 54 (a shift permission flag is "ON"), it is determined at step 55 whether the automatic transmission is now shifting. If the automatic transmission is not now shifting, a shift process is carried out at step 56 and then the 2→3 shift process is carried out at step 57. A control time of the control timer which is used to control the shift control is determined at step 56.

Next, a lock-up judgement is carried out at steps 58, 59. If there is a change of lock-up, a lock-up process is carried out at step 60. If the shift is impossible at the step 54 or if it is determined at step 55 that the automatic transmission is now shifting, the steps 56, 57 are bypassed and step 58 is carried out. When the lock-up process is carried out at step 60, a fail safe control is carried out at step 64 and then an output control is carried out at step 65.

In the output control, when the shift lever is in the R range position under the condition in which the shift permission flag is "ON", or when a shift-up is performed and the engine is in the power-off condition (the throttle opening degree θ is smaller than θ2 (θ<θ2) or the idle switch is "ON") under the condition in which the shift permission flag is "ON", a power-off up-shift flag is "ON" and the shift permission flag is "OFF", and then a shifting flag is "ON". When the shift-up is performed and the engine is in the power-on condition (the throttle opening degree θ is larger than θ2 (θ≧θ2)) with the shift lever being in a position other than the R range position, a power-on up-shift flag is "ON" and the shift permission flag is "OFF", and then the shifting flag is "ON". When the shift-down is performed with the shift lever being in a position other than the R range position, a down-shift flag is "ON" and the shift permission flag is "OFF", and then the shifting flag is "ON".

When the down-shift flag is "ON" under the condition in which the shift permission flag is "ON" or the shifting flag is "ON", a down shift routine is carried out. When the power-off up-shift flag is "ON", a power-off up-shift routine is carried out. When the power-on up-shift flag is "ON", a power-on up-shift routine is carried out. In each of the shift routines, the "ON" and "OFF" of the shift solenoid valves and the timing solenoid valves is controlled in accordance with the control time of the control timer. For example, when the automatic transmission is shifted from the 2nd gear condition to the 3rd gear condition, the 2→3 shift solenoid valve SOL1 is changed ("ON") and then the timing solenoid valve SOL2 is changed after the control timer is ended. Now, the control time of the control timer is determined by a 2→3 shift control timer map stored in the central control unit CPU and shown in FIG. 8 and the control timer is started when the 2→3 shift solenoid valve SOL1 is changed ("ON"). Then, if the other solenoid valves, for example, a lock-up control solenoid valve (not shown) has to change, the central control unit CPU generates an output signal so as to change the lock-up control valve and then the main routine is repeated.

Figure 6:
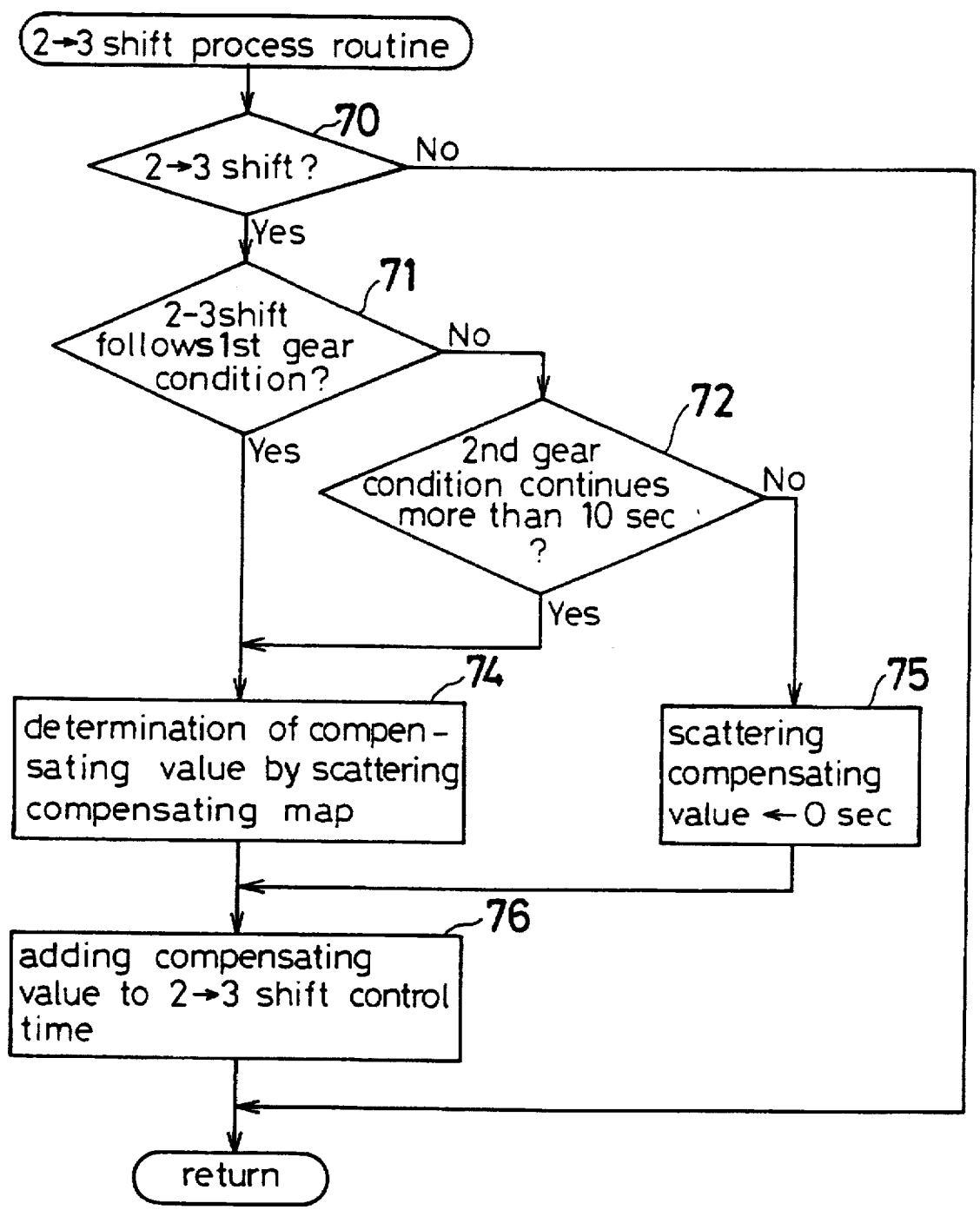
FIG. 6 is a flow chart of a 2→3 shift process routine of FIG. 5.
Figure 7:
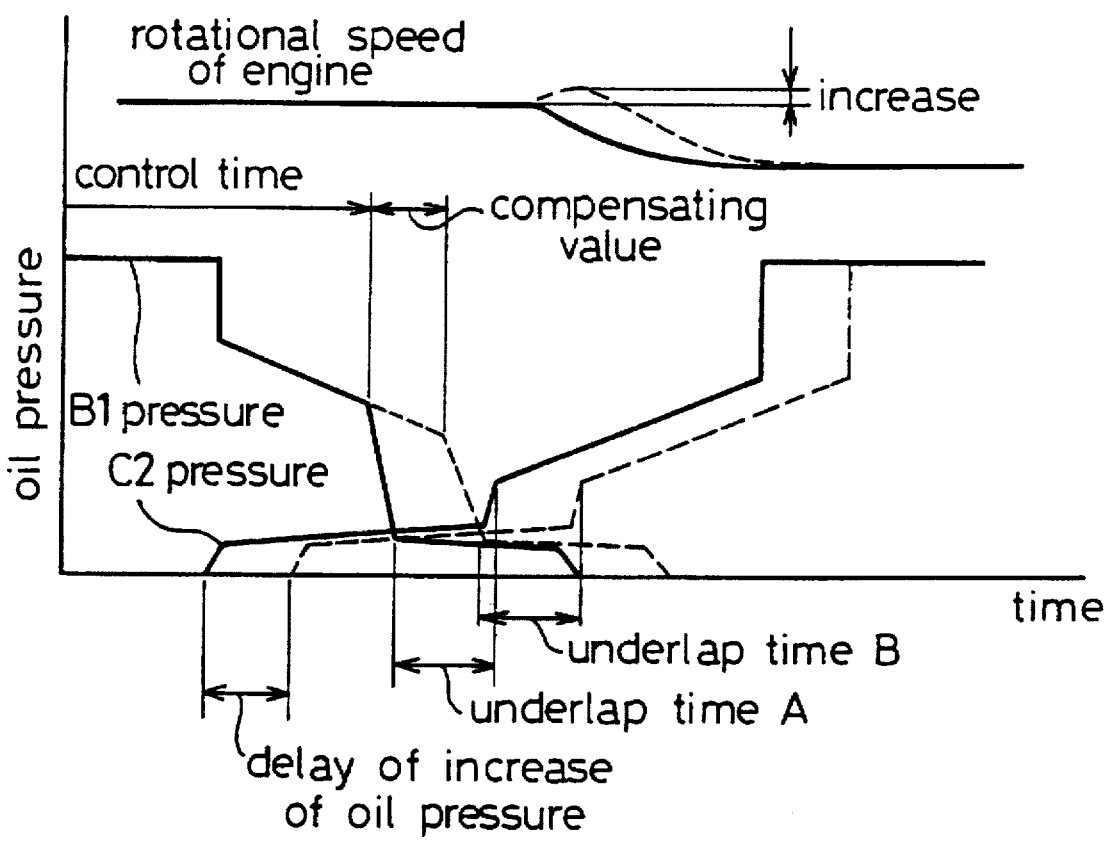
FIG. 7 is a graph illustrating characteristics of the B1 brake device oil pressure PB1 and the C2 clutch device oil pressure PC2 in the automatic transmission in accordance with the present invention.
Figure 8:
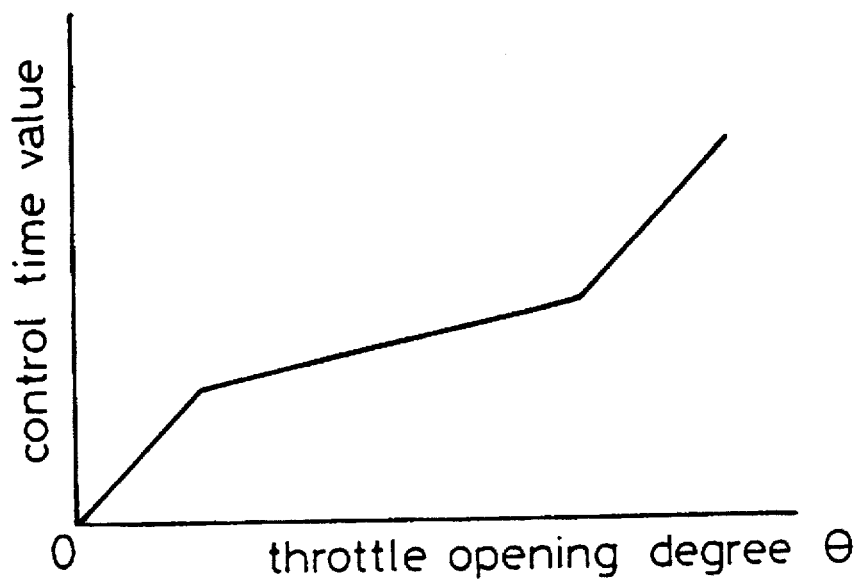
FIG. 8 shows a 2→3 shift control timer map used in the automatic transmission in accordance with the present invention.
Figure 9:
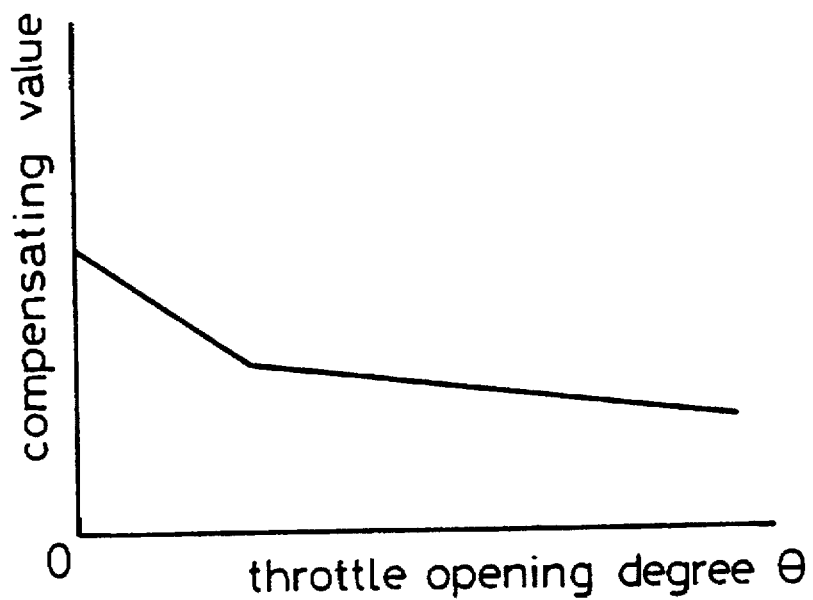
FIG. 9 shows a scattering compensating map used in the automatic transmission in accordance with the present invention.

In this output control operation, the clutch devices and the brake devices are changed over. FIG. 6 shows a flow chart of the 2→3 shift process routine. Referring to FIG. 6, at step 70 it is first judged whether or not the shift is a 2→3 shift. If the shift is not the 2→3 shift, the 2→3 shift process routine is ended. If the shift is the 2→3 shift, it is determined at step 71 whether or not the 2→3 shift follows the operation under the 1st gear condition. If the 2→3 shift does not follow the operation under the 1st gear condition, the routine proceeds to step 72 where it is judged whether or not the 2→3 shift follows an operation under the 2nd gear condition that has continued longer than 10 sec. If the 2→3 shift follows the operation under the 1st gear condition or the operation under the 2nd gear condition has continued longer than 10 sec, a compensating value (sec) is determined by a scattering compensating map which is shown in FIG. 9 and which is stored in the central control unit CPU at a step 74. On the other hand, if the 2→3 shift does not follow an operation of the vehicle under the 1st gear condition or the 2→3 shift follows a vehicle operation under the 2nd gear condition that continued shorter than 10 sec, the compensating value is 0 at step 75. Next, the control time of the control timer is determined by the 2→3 shift control timer map shown in FIG. 8 and the compensating value is added to the control time of the control timer, and then the routine is ended.

In this 2→3 shift process routine, where the 2→3 shift directly follows vehicle operation under the 1st gear condition or where the 2→3 shift directly follows vehicle operation under the 2nd gear condition that has continued longer than 10 sec, the compensating value is added to the control time of the control timer. As shown in FIG. 10, when the 3→2 shift occurs, oil pressure for engaging the C2 clutch device is decreased. However, oil remains in the pressure chamber 29 in FIG. 3 and escapes gradually to the outside of the pressure chamber 29 through the check ball 39. As shown in FIG. 10, when the 2→3 shift directly follows vehicle operation under a 2nd gear condition that has continued shorter than 10 sec, oil in the pressure chamber 29 rapidly reaches a predetermined value (initial amount), when oil is supplied to the pressure chamber 29. In this case, the compensating value (time) is not added to the control time T of the control timer. However, as shown in FIG. 11, when the 2→3 shift follows operation under a 2nd gear condition that has continued longer than 10 sec, oil in the pressure chamber 29 has almost completely or entirely escaped to the outside of the pressure chamber through the check ball 39. As a result, it takes a long time for the amount of oil in the pressure chamber 29 to reach the predetermined value (initial amount) when oil is supplied to the pressure chamber 29. In this case, the compensating value (time) from the map of FIG. 9 is added to the control time of the control timer and so the time at which the B1 brake device is completely disengaged is delayed. Thereby, an extended underlap time is prevented so that the rotational speed of the engine is increased. The underlap time is the interval until the C2 clutch device actually reaches or achieves the engaged condition after the B1 brake device is really made to be in the disengaged condition. Accordingly, the underlap time is properly controlled or adjusted and so it is possible to reduce the shift-shock which otherwise occurs during the shift between gears.

In the situation where the 2→3 shift directly follows operation under the 1st gear condition, since the drum member 41 connected to the sun gear 22 is rotated, oil in the pressure chamber 29 rapidly escapes to the outside of the pressure chamber 29 through the check ball 39 and so it takes a long time for the amount of oil in the pressure chamber 29 to reach the predetermined value (initial amount) when oil is supplied to the pressure chamber 29. In this case, the compensating value (time) from the map of FIG. 9 is added to the control time of the control timer and therefore a time at which the B1 brake device is completely disengaged is delayed. Thus, a long or increased underlap time is prevented and an increase in the rotational speed of the engine is avoided. Also, the shift-shock which otherwise occurs during the shift between gear ratios is reduced or avoided.

As shown in FIG. 12, the line pressure (C2 pressure) supplied to the C2 clutch device has a tendency to decrease when the throttle opening degree θ is small. Therefore, the control time of the control timer and the compensating value (time) is changed by the throttle opening degree θ as shown in FIG. 8 and FIG. 9, respectively. In this way, the underlap time is properly controlled or adjusted and so it is possible to reduce the shift-shock which occurs during the shift between gear ratios.

In the above mentioned embodiment, when the 2→3 shift follows vehicle operation under a 2nd gear condition that has continued longer than 10 sec, the compensating value is added to the control time of the control timer. However, this value of 10 sec. can be changed in accordance with the performance of the automatic transmission. That is, longer or shorter time values can be used. Further, it is possible to determine the compensating value in accordance with amount of oil remaining in the pressure chamber 29.

It can be seen, therefore, that in accordance with the present invention, the compensating time is added to the control time whenever the changeover operation from one gear ratio to another gear ratio is one of a predetermined group of changeover operations that is likely to require a relatively long time for the amount of oil in the pressure chamber 29 to reach the predetermined value (initial amount). As described above in connection with the preferred embodiment, this predetermined group of changeover operations includes the 2→3 shift operation directly following operation under the 2nd gear condition for a period exceeding 10 seconds, and the 2→3 shift operation directly following operation under the 1st gear condition.

As mentioned above, according to the present invention, it is possible to maintain the underlap time almost the same and therefore it is able to reduce the shift-shock which occurs during the shift.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by others and equivalents employed, without departing from the spirit of the present invention. Accordingly, all such changes, variations and equivalents falling within the scope of the claims should be embraced thereby.

What is claimed is:

1. An automatic transmission comprising:
   a housing;
   a planetary gear device disposed in the housing and including a ring gear, a sun gear which is disposed inside of the ring gear and which is rotated around an axis that is coaxial with the ring gear, a carrier, and a pinion which is rotatably supported on the carrier and which is engageable with the ring gear and the sun gear, the sun gear being provided with a pressure chamber for receiving oil;
   an input side shaft which rotates with the ring gear;
   an output side shaft which rotates with the carrier;
   a clutch device selectively positionable in an engaged condition in which the sun gear is engaged with the input side shaft and a disengaged condition in which the sun gear is disengaged from the input side shaft in response to oil pressure in the pressure chamber of the sun gear;
   a check valve which permits oil in the pressure chamber to flow outside of the pressure chamber when the oil pressure in the pressure chamber is lower than a predetermined value and which prevents oil in the pressure chamber from flowing outside of the pressure chamber when the oil pressure in the pressure chamber is higher than the predetermined value;
   a brake device selectively positionable in an engaged condition in which the sun gear is engaged with the housing and a disengaged condition in which the sun gear is disengaged from the housing; and
   transmission control means for controlling operation of the clutch device and the brake device to changeover among a first operating condition in which the clutch device and the brake device are in the disengaged condition, a second operating condition in which the clutch device is in the disengaged condition and the brake device is in the engaged condition, and a third operating condition in which the clutch device is in the engaged condition and the brake device is in the disengaged condition, the transmission control means including means for setting a control time upon changeover from the second operating condition to the third operating condition during which the brake device is maintained in the engaged condition until changing to the disengaged condition, and compensating means for adding a compensating time to the control time upon changeover from the second operating condition to the third operating condition at least when changeover from the second operating condition to the third operating condition follows operation under the first operating condition, said compensating time being determined on the basis of the time until the oil pressure in the pressure chamber becomes a predetermined value after oil is supplied to an empty pressure chamber.

2. An automatic transmission as recited in claim 1, wherein the compensating time is a time required to increase the oil pressure in the pressure chamber to a predetermined value.

3. An automatic transmission as recited in claim 2, wherein the control time is determined in accordance with an opening degree of a throttle valve.

4. An automatic transmission as recited in claim 3, wherein the compensating time is determined in accordance with the opening degree of the throttle valve.

5. An automatic transmission as recited in claim 1, wherein the compensating means adds the compensating time to the control time upon changeover from the second operating condition to the third operating condition when changeover from the second operating condition to the third operating condition follows operation under the second operating condition that has continued longer than a predetermined time.

6. An automatic transmission as recited in claim 5, wherein the predetermined time is determined based on the time required for the oil pressure in the pressure chamber to drop to a predetermined pressure after changeover to the second operating condition.

7. An automatic transmission as recited in claim 1, wherein the control time is determined in accordance with an opening degree of a throttle valve.

8. An automatic transmission as recited in claim 7, wherein the compensating time is determined in accordance with the opening degree of the throttle valve.

9. An automatic transmission comprising:

a housing;

a planetary gear device disposed in the housing and including a ring gear, a sun gear which is disposed inside of the ring gear and which is rotated around an axis that is coaxial with the ring gear, a carrier, and a pinion which is rotatably supported on the carrier and which is engageable with the ring gear and the sun gear, the sun gear being provided with a pressure chamber for receiving oil;

an input side shaft which rotates with the ring gear;

an output side shaft which rotates with the carrier;

a clutch device selectively positionable in an engaged condition in which the sun gear is engaged with the input side shaft and a disengaged condition in which the sun gear is disengaged from the input side shaft in response to oil pressure in the pressure chamber of the sun gear;

a check valve which permits oil in the pressure chamber to flow outside of the pressure chamber when the oil pressure in the pressure chamber is lower than a predetermined value and which prevents oil in the pressure chamber from flowing outside of the pressure chamber when the oil pressure in the pressure chamber is higher than the predetermined value;

a brake device selectively positionable in an engaged condition in which the sun gear is engaged with the housing and a disengaged condition in which the sun gear is disengaged from the housing; and transmission control means for controlling operation of the clutch device and the brake device to changeover among a first operating condition in which the clutch device and the brake device are in the disengaged condition, a second operating condition in which the clutch device is in the disengaged condition and the brake device is in the engaged condition, and a third operating condition in which the clutch device is in the engaged condition and the brake device is in the disengaged condition, the transmission control means including means for setting a control time upon changeover from the second operating condition to the third operating condition during which the brake device is maintained in the engaged condition until changing to the disengaged condition, the transmission control means including compensating means for adding a compensating time to the control time upon changeover from the second operating condition to the third operating condition when changeover from the second operating condition to the third operating condition follows operation under the second operating condition that has continued longer than a predetermined time.

10. An automatic transmission as recited in claim 9, wherein the predetermined time is determined based on the time required for the oil pressure in the pressure chamber to drop to a predetermined pressure after changeover to the second operating condition.

11. An automatic transmission comprising:

a housing;

a planetary gear device disposed in the housing and including a ring gear, a sun gear which is disposed inside of the ring gear and which is rotated around an axis that is coaxial with the ring gear, a carrier, and a pinion which is rotatably supported on the carrier and which is engageable the ring gear and the sun gear, the sun gear being provided with a pressure chamber for receiving oil;

an input side shaft which rotates with the ring gear;

an output side shaft which rotates with the carrier;

a clutch device selectively positionable in an engaged condition in which the sun gear is engaged with the input side shaft and a disengaged condition in which the sun gear is disengaged from the input side shaft in response to oil pressure in the pressure chamber of the sun gear;

a check valve which permits oil in the pressure chamber to flow outside of the pressure chamber when the oil pressure in the pressure chamber is lower than a predetermined value and which prevents oil in the pressure chamber from flowing outside of the pressure chamber when the oil pressure in the pressure chamber is higher than the predetermined value;

a brake device selectively positionable in an engaged condition in which the sun gear is engaged with the housing and a disengaged condition in which the sun gear is disengaged from the housing; and transmission control means for controlling operation of the clutch device and the brake device to effect a changeover operation among a plurality of operating conditions, the transmission control means including means for setting a control time upon changeover from one operating condition to another operating condition during which the brake device is maintained in the engaged condition until changing to the disengaged condition, and for adding a compensating time to the control time when the changeover operation from the one operating condition to the another operating condition is determined to be a changeover operation falling within a predetermined group of changeover operations.

12. An automatic transmission recited in claim 11, wherein the transmission control means controls operation of the clutch device and the brake device to changeover among a first operating condition in which the clutch device and the brake device are in the disengaged condition, a second operating condition in which the clutch device is in the disengaged condition and the brake device is in the engaged condition, and a third operating condition in which the clutch device is in the engaged condition and the brake device is in the disengaged condition, wherein said predetermined group of changeover operations includes a changeover operation from the second operating condition to the third operating condition following operation under the second operating condition that has continued longer than a predetermined time.

13. An automatic transmission recited in claim 11, wherein the transmission control means controls operation of the clutch device and the brake device to changeover among a first operating condition in which the clutch device and the brake device are in the disengaged condition, a second operating condition in which the clutch device is in the disengaged condition and the brake device is in the engaged condition, and a third operating condition in which the clutch device is in the engaged condition and the brake device is in the disengaged condition, wherein said predetermined group of changeover operations includes a changeover operation from the second operating condition to the third operating condition directly following operation under the first operating condition.

14. An automatic transmission recited in claim 11, including a map for determining the compensating time, said compensating time being determined based on a throttle opening degree.

* * * * *